US012803661B2

(12) United States Patent
Wang et al.

(10) Patent No.: US 12,803,661 B2
(45) Date of Patent: Nov. 17, 2026

(54) SYSTEM, METHOD, AND COMPUTER PROGRAM PRODUCT FOR RECOVERY OF TRANSPORT SYSTEM FAULTS IN OPTICAL COMMUNICATIONS NETWORKS

(71) Applicant: II-VI Delaware, Inc., Wilmington, DE (US)

(72) Inventors: Yajun Wang, Naperville, IL (US); Michael J.L. Cahill, Wilmington, DE (US); Glenn D. Bartolini, Wilmington, DE (US); Ian Peter Mcclean, Wilmington, DE (US); Peigang Hu, Shanghai (CN); Hanz Xu, Shanghai (CN); Yingkan Chen, Shanghai (CN); Shaohua Cai, Shanghai (CN); Jun Han, Shanghai (CN); Sam Fu, Shanghai (CN); Qingyu Li, Cupertino, CA (US)

(73) Assignee: II-VI Delaware, Inc., Wilmington, DE (US)

( * ) Notice: Subject to any disclaimer, the term of this patent is extended or adjusted under 35 U.S.C. 154(b) by 207 days.

(21) Appl. No.: 18/540,954

(22) Filed: Dec. 15, 2023

(65) Prior Publication Data

US 2025/0158706 A1 May 15, 2025

(30) Foreign Application Priority Data

Nov. 10, 2023 (CN) ........................ 202311495039.0

(51) Int. Cl.
*H04B 10/03* (2013.01)

(52) U.S. Cl.
CPC .................................. *H04B 10/03* (2013.01)

(58) Field of Classification Search
CPC .................................................... H04B 10/03
See application file for complete search history.

(56) References Cited

U.S. PATENT DOCUMENTS

| | | | | |
|---|---|---|---|---|
| 9,632,391 | B2 | 4/2017 | Wagener et al. | |
| 12,231,832 | B2 | 2/2025 | Fennema et al. | |
| 2013/0129348 | A1 | 5/2013 | Mak et al. | |
| 2014/0212133 | A1* | 7/2014 | Kobayashi | H04B 10/07955 398/25 |
| 2020/0153502 | A1* | 5/2020 | Buset | H04B 10/0777 |
| 2020/0304204 | A1* | 9/2020 | Syed | H04B 10/0793 |
| 2020/0336238 | A1* | 10/2020 | St-Laurent | G02F 1/313 |

(Continued)

FOREIGN PATENT DOCUMENTS

| | | | |
|---|---|---|---|
| CN | 105784328 | A | 7/2016 |
| CN | 110333193 | A | 10/2019 |

*Primary Examiner* — Shi K Li

(74) *Attorney, Agent, or Firm* — McAndrews, Held & Malloy, Ltd.

(57) ABSTRACT

Systems for recovery of transport system faults may include at least one processor programmed or configured to identify a presence of a reduction of power in an optical transmission band of a plurality of optical transmission bands of an optical communications network, determine a cause of the reduction of power in the optical transmission band based on identifying the presence of the reduction of power in the optical transmission band, and perform an action to rectify the reduction of power in the optical transmission band using an optical communications light source. Methods and computer program products are also disclosed.

11 Claims, 11 Drawing Sheets

(56) References Cited

U.S. PATENT DOCUMENTS

| | | | |
|---|---|---|---|
| 2022/0334416 | A1 | 10/2022 | Jiang et al. |
| 2024/0162675 | A1 | 5/2024 | McClean et al. |
| 2025/0023644 | A1 | 1/2025 | Li et al. |

* cited by examiner

600

801A

| FLT | Fast Trigger | Ultra-Fast-Scanning | Ultra-High-Speed Channelized ASE |
|---|---|---|---|
| | 1-2ms | <10ms | <10ms SW, <10ms Ch-ASE |
| 1 | $P_L$ | L-Band | Path-C1, Path-L2 |
| 2A | EDFA LOP & $P_C$ | C-Band | Path-C2, Path-L1 |
| 2B | EDFA LOP & $P_L$ | L-Band | Path-C1, Path-L2 |
| 3A | EDFA LOS | C-Band | Path-C2, Path-L1 |
| 3B | EDFA LOS | L-Band | Path-C1, Path-L2 |
| 4--9 | Any of $\{P_1, ..., P_N\}$ | C+L Band | Path-C1, Path-L1 |

FIG. 8B

801B

| FLT | Fast Trigger | Ultra-Fast-Scanning | Ultra-High-Speed Channelized ASE |
|---|---|---|---|
| | 1-2ms | <10ms | <10ms SW, <10ms Ch-ASE |
| 1 | $P_L$ | L-Band | Path-C1, Path-L2 |
| 2A | EDFA LOP & $P_C$ | C-Band | Path-C2, Path-L1 |
| 2B | EDFA LOP & $P_L$ | L-Band | Path-C1, Path-L2 |
| 3A | EDFA LOS | C-Band | Path-C2, Path-L1 |
| 3B | EDFA LOS | L-Band | Path-C1, Path-L2 |
| 4--9 | Any of $\{P_1, \ldots, P_N\}$ | C+L Band | Path-C1, Path-L1 |
| Egress WSS | EDFA LOS | C-Band<br>L-band | Path-C2, Path-L1<br>Path-C1, Path-L2 |

FIG. 9B

SYSTEM, METHOD, AND COMPUTER PROGRAM PRODUCT FOR RECOVERY OF TRANSPORT SYSTEM FAULTS IN OPTICAL COMMUNICATIONS NETWORKS

CROSS-REFERENCE TO RELATED APPLICATION

This application claims priority to Chinese Patent Application No. 202311495039.0 filed Nov. 10, 2023, the disclosure of which is hereby incorporated by reference in its entirety.

BACKGROUND

1. Field

This disclosed subject matter relates generally to fiber-optic communication and, in some non-limiting embodiments, to systems, methods, and computer program products for recovery of transport system faults in optical communications networks.

2. Technical Considerations

Optical communication (e.g., optical telecommunication) may refer to a method of communication between two locations at a distance apart using light to carry information. An optical communication system may use a transmitter, which encodes a message into an optical signal, a channel, which carries the optical signal to its destination, and a receiver, which reproduces the message from the optical signal that is received by the receiver.

Fiber-optic communication may refer to a form of optical communication that involves transmitting information from one place to another by sending pulses of light (e.g., infrared light) through an optical fiber. The light may be used as a form of carrier wave that is modulated to carry the information. Optical fiber may be preferred over electrical cabling in specific situations, such as when high bandwidth, long distance, and/or immunity to electromagnetic interference is required. Fiber-optic communication can transmit voice, video, data, and telemetry through local area networks or across long distances.

SUMMARY

Accordingly, it is an object of the presently disclosed subject matter to provide systems, devices, products, and/or methods that overcome some or all of the deficiencies of the prior art.

According to non-limiting embodiments, provided is a system for recovery of transport system faults, comprising: at least one processor programmed or configured to: identify a presence of a reduction of power in an optical transmission band of a plurality of optical transmission bands of an optical communications network; determine a cause of the reduction of power in the optical transmission band based on identifying the presence of the reduction of power in the optical transmission band; and perform an action to rectify the reduction of power in the optical transmission band using an optical communications light source.

According to non-limiting embodiments, provided is a method for recovery of transport system faults, comprising: identifying, with at least one processor, a presence of a reduction of power in an optical transmission band of a plurality of optical transmission bands of an optical communications network; determining, with at least one processor, a cause of the reduction of power in the optical transmission band based on identifying the presence of the reduction of power in the optical transmission band; and performing, with at least one processor, an action to rectify the reduction of power in the optical transmission band using an optical communications light source.

According to non-limiting embodiments, provided is a computer program product for recovery of transport system faults comprising at least one non-transitory computer-readable medium including one or more instructions that, when executed by at least one processor, cause the at least one processor to: identify a presence of a reduction of power in an optical transmission band of a plurality of optical transmission bands of an optical communications network; determine a cause of the reduction of power in the optical transmission band based on identifying the presence of the reduction of power in the optical transmission band; and perform an action to rectify the reduction of power in the optical transmission band using an optical communications light source.

Further embodiments are set forth in the following numbered clauses:

Clause 1: A system for recovery of transport system faults, comprising: at least one processor programmed or configured to: identify a presence of a reduction of power in an optical transmission band of a plurality of optical transmission bands of an optical communications network; determine a cause of the reduction of power in the optical transmission band based on identifying the presence of the reduction of power in the optical transmission band; and perform an action to rectify the reduction of power in the optical transmission band using an optical communications light source.

Clause 2: The system of clause 1, wherein, when identifying the presence of a failure in the optical transmission band of the plurality of optical transmission bands of the optical communications network, the at least one processor is programmed or configured to: identify the presence of the reduction of power in a first optical transmission band of the optical communications network based on a reading of an optical channel monitor (OCM).

Clause 3: The system of clause 1 or 2, wherein, when determining the cause of the reduction of power in the optical transmission band, the at least one processor is programmed or configured to: receive a first signal indicating a failure condition of an optical communications device of the optical communications network from a first photodiode of a plurality of photodiodes; receive a second signal indicating a failure condition of the optical communications device of the optical communications network from a second photodiode of the plurality of photodiodes; and determine an identification of the optical communications device based on the first signal and the second signal.

Clause 4: The system of any of clauses 1-3, wherein, when determining the cause of the failure, the at least one processor is programmed or configured to: determine that the optical communications device is not functioning properly based on the first signal and the second signal.

Clause 5: The system of any of clauses 1-4, wherein, when performing the action to rectify the reduction of power in the optical transmission band using the optical communications light source, the at least one processor is programmed or configured to: activate a first optical switch based on the first signal and the second signal; activate a second optical switch based on the first signal and the second signal; and activate the optical communications light source based on activating the first optical switch and the second optical switch.

Clause 6: The system of any of clauses 1-5, wherein, when performing the action to rectify the reduction of power in the optical transmission band using the optical communications light source, the at least one processor is programmed or configured to: activate at least one of wavelength selective switch (WSS) or a wavelength blocking (WB) switch based on the first signal and the second signal; and activate the optical communications light source based on activating the WSS or the WB switch.

Clause 7: The system of any of clauses 1-6, wherein, when performing the action to rectify the reduction of power in the optical transmission band using the optical communications light source, the at least one processor is programmed or configured to: perform the action to rectify the reduction of power in the optical transmission band using the optical communications light source within 50 ms of identifying the presence of the reduction of power in the optical transmission band.

Clause 8: A method for recovery of transport system faults, comprising: identifying, with at least one processor, a presence of a reduction of power in an optical transmission band of a plurality of optical transmission bands of an optical communications network; determining, with at least one processor, a cause of the reduction of power in the optical transmission band based on identifying the presence of the reduction of power in the optical transmission band; and performing, with at least one processor, an action to rectify the reduction of power in the optical transmission band using an optical communications light source.

Clause 9: The method of clause 8, wherein identifying the presence of a failure in the optical transmission band of the plurality of optical transmission bands of the optical communications network comprises: identifying the presence of the reduction of power in a first optical transmission band of the optical communications network based on a reading of an optical channel monitor (OCM).

Clause 10: The method of clause 8 or 9, wherein determining the cause of the reduction of power in the optical transmission band comprises: receiving a first signal indicating a failure condition of an optical communications device of the optical communications network from a first photodiode of a plurality of photodiodes; receiving a second signal indicating a failure condition of the optical communications device of the optical communications network from a second photodiode of the plurality of photodiodes; and determining an identification of the optical communications device based on the first signal and the second signal.

Clause 11: The method of any of clauses 8-10, wherein determining the cause of the failure comprises: determining that the optical communications device is not functioning properly based on the first signal and the second signal.

Clause 12: The method of any of clauses 8-11, wherein performing the action to rectify the reduction of power in the optical transmission band using the optical communications light source comprises: activating a first optical switch based on the first signal and the second signal; activating a second optical switch based on the first signal and the second signal; and activating the optical communications light source based on activating the first optical switch and the second optical switch.

Clause 13: The method of any of clauses 8-12, wherein performing the action to rectify the reduction of power in the optical transmission band using the optical communications light source comprises: activating at least one of wavelength selective switch (WSS) or a wavelength blocking (WB) switch based on the first signal and the second signal; and activating the optical communications light source based on activating the WSS or the WB switch.

Clause 14: The method of any of clauses 8-13, wherein performing the action to rectify the reduction of power in the optical transmission band using the optical communications light source comprises: performing the action to rectify the reduction of power in the optical transmission band using the optical communications light source within 50 ms of identifying the presence of the reduction of power in the optical transmission band.

Clause 15: A computer program product for recovery of transport system faults comprising at least one non-transitory computer-readable medium including one or more instructions that, when executed by at least one processor, cause the at least one processor to: identify a presence of a reduction of power in an optical transmission band of a plurality of optical transmission bands of an optical communications network; determine a cause of the reduction of power in the optical transmission band based on identifying the presence of the reduction of power in the optical transmission band; and perform an action to rectify the reduction of power in the optical transmission band using an optical communications light source.

Clause 16: The computer program product of clause 15, wherein, the one or more instructions that cause the at least one processor to identify the presence of a failure in the optical transmission band of the plurality of optical transmission bands of the optical communications network, cause the at least one processor to: identify the presence of the reduction of power in a first optical transmission band of the optical communications network based on a reading of an optical channel monitor (OCM).

Clause 17: The computer program product of clause 15 or 16, wherein, the one or more instructions that cause the at least one processor to determine the cause of the reduction of power in the optical transmission band, cause the at least one processor is programmed or configured to: receive a first signal indicating a failure condition of an optical communications device of the optical communications network from a first photodiode of a plurality of photodiodes; receive a second signal indicating a failure condition of the optical communications device of the optical communications network from a second photodiode of the plurality of photodiodes; and determine an identification of the optical communications device based on the first signal and the second signal.

Clause 18: The computer program product of any of clauses 15-17, wherein, the one or more instructions that cause the at least one processor to determine the cause of the failure, cause the at least one processor to: determine that the optical communications device is not functioning properly based on the first signal and the second signal.

Clause 19: The computer program product of any of clauses 15-18, wherein, the one or more instructions that cause the at least one processor to perform the action to rectify the reduction of power in the optical transmission band using the optical communications light source, cause the at least one processor to: activate a first optical switch based on the first signal and the second signal; activate a second optical switch based on the first signal and the second signal; and activate the optical communications light source based on activating the first optical switch and the second optical switch.

Clause 20: The computer program product of any of clauses 15-19, wherein, the one or more instructions that cause the at least one processor to perform the action to rectify the reduction of power in the optical transmission band using the optical communications light source, cause the at least one processor to: activate at least one of wavelength selective switch (WSS) or a wavelength blocking (WB) switch based on the first signal and the second signal; and activate the optical communications light source based on activating the WSS or the WB switch.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular forms of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which:

FIGS. 8A-8B are diagrams of a non-limiting embodiment of a ROADM node and a table associated with actions for recovery of transport system faults of the ROADM node according to the presently disclosed subject matter; and FIGS. 9A-9B are diagrams of another non-limiting embodiment of a ROADM node and a table associated with actions for recovery of transport system faults of the ROADM node according to the presently disclosed subject matter.

DESCRIPTION

Figure 1:
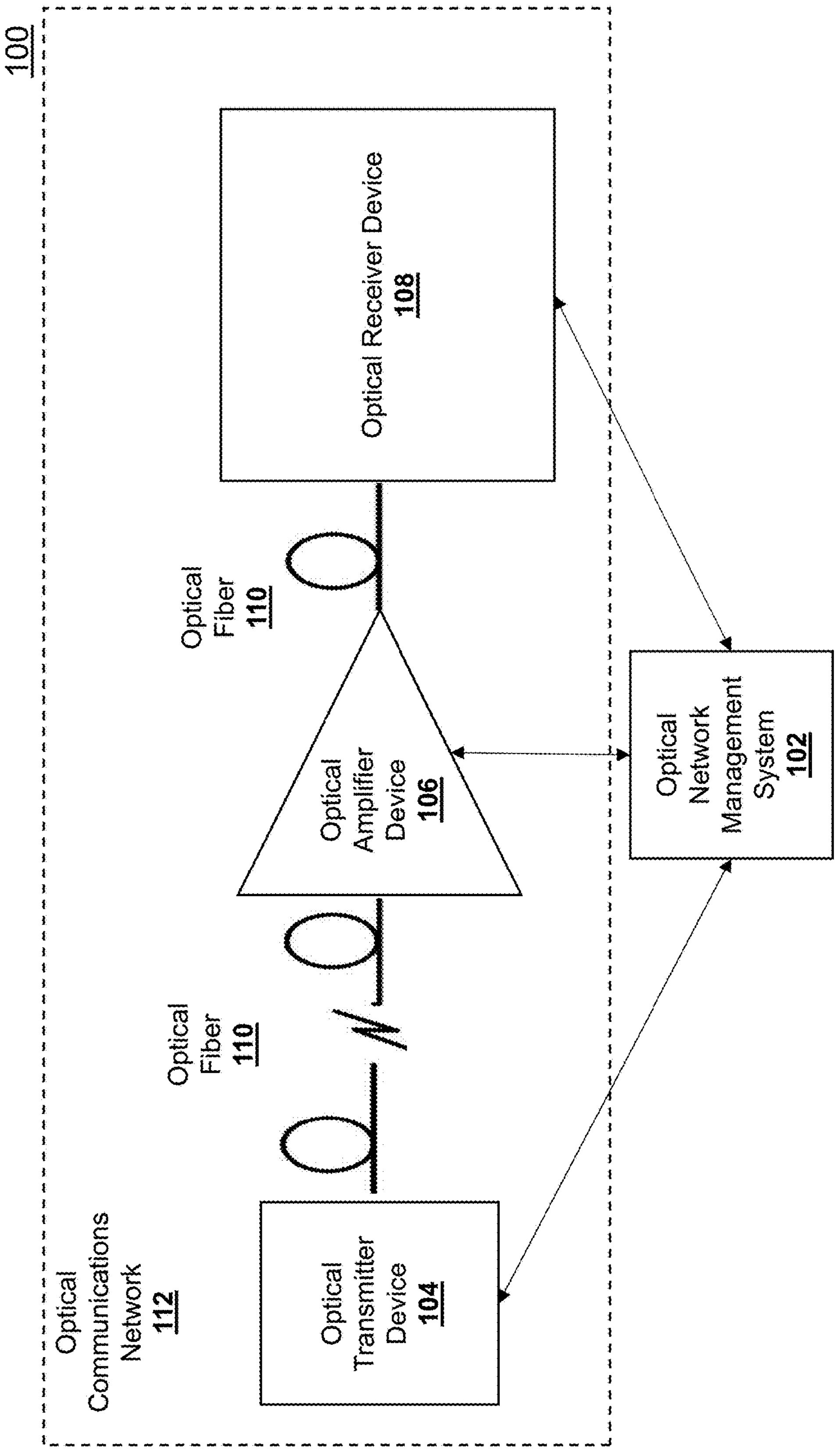
FIG. 1 is a diagram of a non-limiting embodiment of an environment in which systems, devices, products, and/or methods, described herein, may be implemented according to the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments of the disclosed subject matter. Hence, specific dimensions and other physical characteristics related to the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

In some instances, fiber optic communication may involve the use of dense wavelength-division multiplexing (DWDM), which is an optical fiber multiplexing technology that is used to increase the bandwidth of existing fiber optic communication networks. DWDM may combine data signals (e.g., signals carrying information) from different sources over a single pair of optical fibers, while maintaining complete separation of the data signals. DWDM may involve the use of C-band, L-band, and other band signals. As part of the present disclosure, C-band and L-band may be referred in some non-limiting embodiments. However, the present disclosure is not limited, and other bands or combinations of bands may be utilized.

When C-band and L-band signals propagate along a single optical fiber, signals from the C-band and L-band interact with each other that change the power of the signals. In some instances, stimulated Raman scattering (SRS) in optical fiber may transfer energy from higher to lower frequencies, such as from the C-band to the L-band, and the magnitude of the energy that is transferred may depend on a strength of the signals and the separation between the signals.

A solution to SRS may involve amplification of signals from the C-band and the L-band. In some instances, a design for amplification may use separate gain blocks (e.g., separate erbium-doped fiber amplifier (EDFA) gain blocks), and there may be a possibility of outages in one band (e.g. a failure caused by an amplifier and/or electrical failure) causing issues in the other band due to effects associated with changing SRS. However, issues caused on both bands may be highly undesirable when only one band experiences an outage, accordingly, an effect on a band not experiencing an outage is preferred to be short and limited.

Non-limiting embodiments of the disclosed subject matter are directed to an optical network management system for recovery of transport system faults, which is programmed or configured to: identify a presence of a reduction of power in an optical transmission band of a plurality of optical transmission bands of an optical communications network; determine a cause of the reduction of power in the optical transmission band based on identifying the presence of the reduction of power in the optical transmission band; and perform an action to rectify the reduction of power in the optical transmission band using an optical communications light source. In some non-limiting embodiments, when identifying the presence of a failure in the optical transmission band of the plurality of optical transmission bands of the optical communications network, the optical network management system is programmed or configured to identify the presence of the reduction of power in a first optical transmission band of the optical communications network based on a reading of an optical channel monitor (OCM). In some non-limiting embodiments, when determining the cause of the reduction of power in the optical transmission band, the optical network management system is programmed or configured to receive a first signal indicating a failure condition of an optical communications device of the optical communications network from a first photodiode of a plurality of photodiodes, receive a second signal indicating a failure condition of the optical communications device of the optical communications network from a second photodiode of the plurality of photodiodes, and determine an identification of the optical communications device based on the first signal and the second signal.

In some non-limiting embodiments, when determining the cause of the failure, the optical network management system is programmed or configured to determine that the optical communications device is not functioning properly based on the first signal and the second signal. In some non-limiting embodiments, when performing the action to rectify the reduction of power in the optical transmission band using the optical communications light source, the optical network management system is programmed or configured to activate a first optical switch based on the first signal and the second signal, activate a second optical switch based on the first signal and the second signal, and activate the optical communications light source based on activating the first optical switch and the second optical switch.

In some non-limiting embodiments, when performing the action to rectify the reduction of power in the optical transmission band using the optical communications light source, the at least one processor is programmed or configured to activate at least one of wavelength selective switch (WSS) or a wavelength blocking (WB) switch based on the first signal and the second signal and activate the optical communications light source based on activating the WSS or the WB switch. In some non-limiting embodiments, when performing the action to rectify the reduction of power in the optical transmission band using the optical communications light source, the optical network management system is programmed or configured to perform the action to rectify the reduction of power in the optical transmission band using the optical communications light source within 50 ms of identifying the presence of the reduction of power in the optical transmission band.

In this way, the optical network management system may provide for fast fault identification and system recovery based on ultra-fast optical channel management (OCM) and fast C+L wide band OCM, and provides protection under multiple fault conditions, which may protect against fault related to a specific band or a sub-set of (e.g., continuous or non-continuous) channels that can be detected and quickly recovered. In some non-limiting embodiments, the optical network management system may provide applicability for identifying specific fault and inject fast channelized ASE for fast recovery. In some non-limiting embodiments, the optical network management system may achieve fault restoration time within 50 ms, and in some non-limiting embodiments, less than 30 ms.

Referring now to FIG. 1, FIG. 1 is a diagram of an example environment 100 in which systems, devices, products, and/or methods, described herein, may be implemented. As shown in FIG. 1, environment 100 may include optical network management system 102, optical transmitter device 104, optical amplifier device 106, and optical receiver device 108. Optical transmitter device 104, optical amplifier device 106, and optical receiver device 108 may be connected via optical fiber 110 to form optical communications network 112. In some non-limiting embodiments, optical network management system 102, optical transmitter device 104, optical amplifier device 106, and optical receiver device 108 may interconnect (e.g., establish a connection to communicate) via wired connections, wireless connections, or a combination of wired and wireless connections.

Optical network management system 102 may include one or more devices configured to communicate with optical transmitter device 104, optical amplifier device 106, and/or optical receiver device 108, and to monitor and control operation of components of an optical communications network. For example, optical network management system 102 may include a circuit, a controller, a processing device, a computing device, (e.g., a server, a group of servers, etc.) and/or other like devices. Additionally or alternatively, optical network management system 102 may include an OCM (e.g., a fast OCM, an OCM sensing device, etc.) and/or other components of an optical communications network. In some non-limiting embodiments, optical network management system 102 may be in communication with a data storage device, which may be local or remote to optical network management system 102. In some non-limiting embodiments, optical network management system 102 may be capable of receiving information from, storing information in, transmitting information to, and/or searching information stored in the data storage device.

Optical transmitter device 104 may include one or more devices configured to transmit an optical signal (e.g., use an electrical signal to modulate the power of a light source) on an optical communications network. For example, optical transmitter device 104 may include an optical transmitter, an optical transceiver (e.g., an optical and electrical transceiver), and/or other like devices. Additionally or alternatively, optical network management system 102 may include a semiconductor device, such as a photodiode (e.g., a light-sensitive semiconductor diode), a light-emitting diode (LED), a laser diode, and/or the like. In some non-limiting embodiments, optical transmitter device 104 may include one or more devices configured to communicate with optical network management system 102.

Optical amplifier device 106 may include one or more devices configured to amplify (e.g., amplify directly, without conversion to an electrical signal) an optical signal on an optical communications network. For example, optical amplifier device 106 may include an optical amplifier (e.g., an EDFA), a repeater (e.g., an optical repeater, an optoelectronic repeater, etc.), and/or other like devices. In some non-limiting embodiments, optical amplifier device 106 may include one or more devices configured to communicate with optical network management system 102.

Optical receiver device 108 may include one or more devices configured to receive an optical signal on an optical communications network. For example, optical receiver device 108 may include an optical receiver (e.g., a coherent optical receiver), a photodetector, and/or other like devices. In some non-limiting embodiments, optical receiver device 108 may include one or more devices configured to communicate with optical network management system 102.

Figure 2:
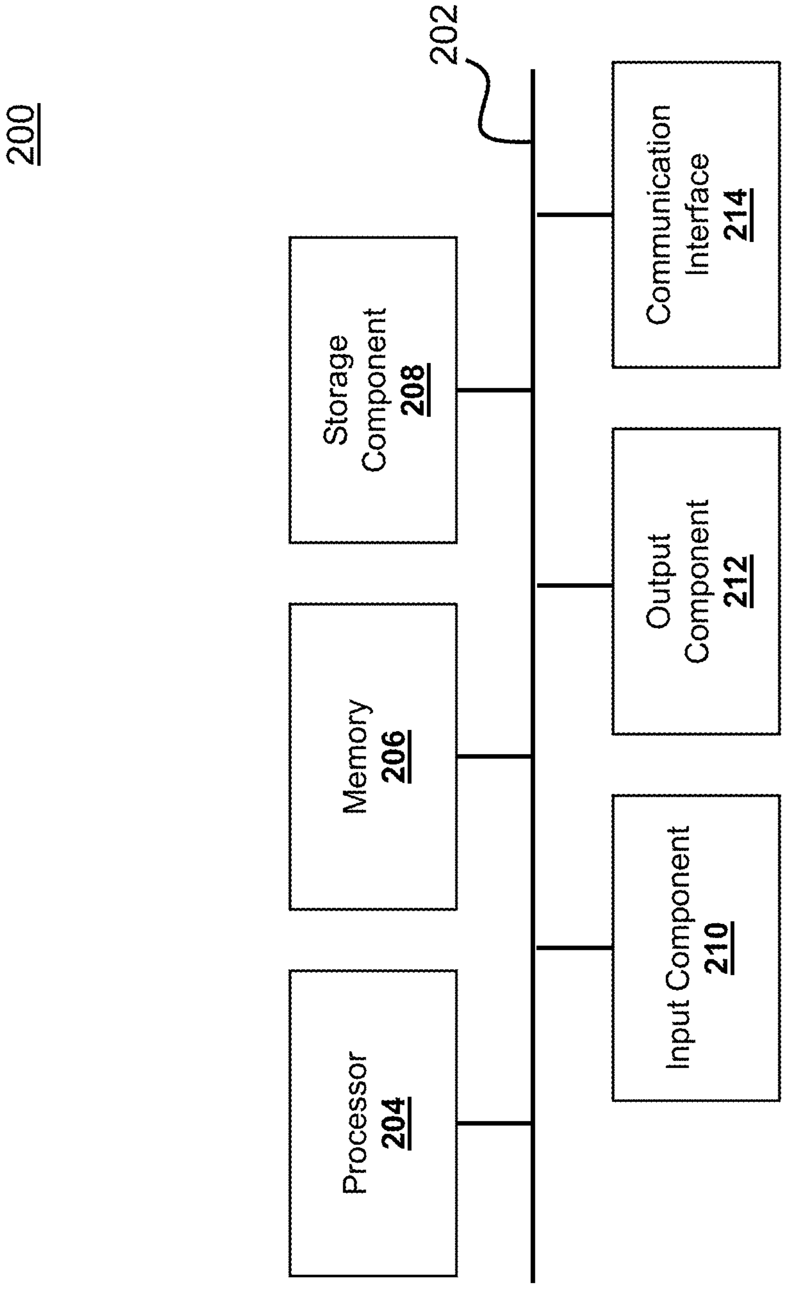
FIG. 2 is a diagram of a non-limiting embodiment of components of one or more devices of FIG. 1.

Referring now to FIG. 2, FIG. 2 is a diagram of example components of a device 200. Device 200 may correspond to optical network management system 102 (e.g., one or more devices of optical network management system 102), optical transmitter device 104, optical amplifier device 106, and/or optical receiver device 108. In some non-limiting embodiments, optical network management system 102, optical transmitter device 104, optical amplifier device 106, and/or optical receiver device 108 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), a device configured to implement logic functions, etc.) that can be programmed to perform a function. Memory 206 may include random access memory (RAM), read-only memory (ROM), and/or another type of dynamic or static storage memory (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more LEDs, etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
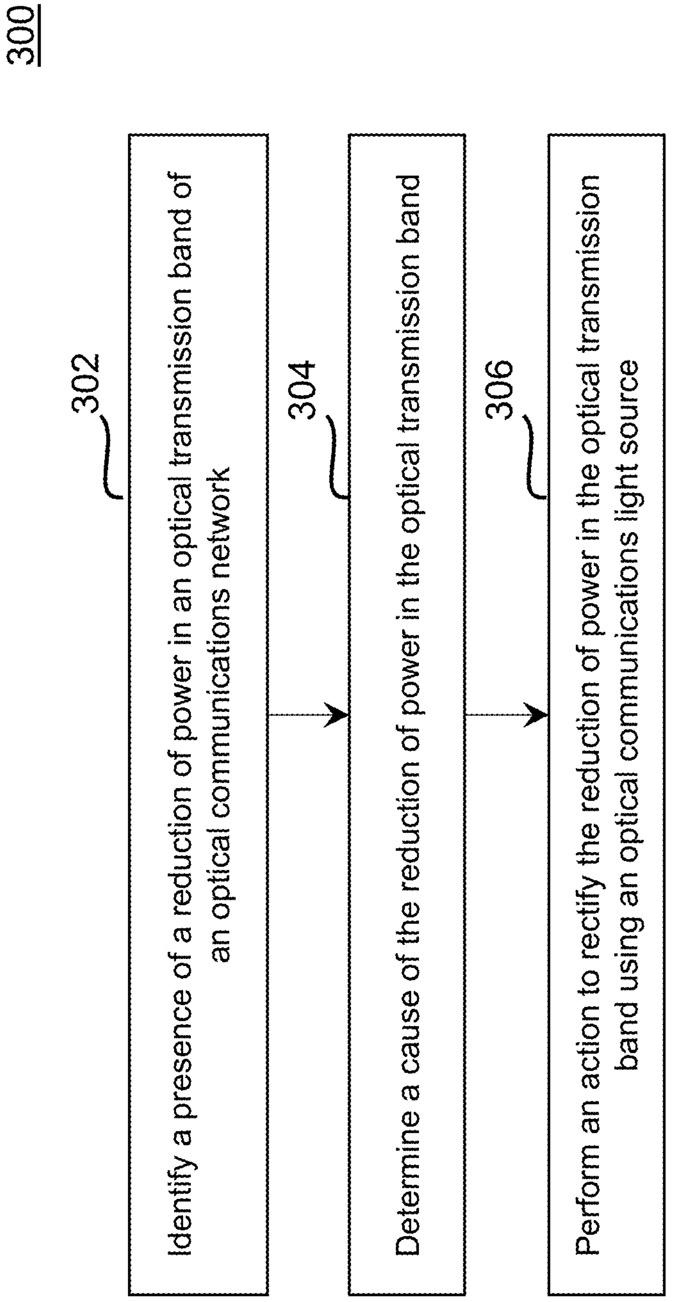
FIG. 3 is a flowchart of a non-limiting embodiment of a process for recovery of transport system faults in an optical communications network.

Referring now to FIG. 3, FIG. 3 is a flowchart of a non-limiting embodiment of a process 300 for recovery of transport system faults in an optical communications network. In some non-limiting embodiments, one or more of the steps of process 300 may be performed (e.g., completely, partially, etc.) by optical network management system 102 (e.g., one or more devices of optical management system 102). In some non-limiting embodiments, one or more of the steps of process 300 may be performed (e.g., completely, partially, etc.) by another device or a group of devices separate from or including optical management system 102 (e.g., one or more devices of feature management system 102), optical transmitter device 104, optical amplifier device 106, and/or optical receiver device 108.

As shown in FIG. 3, at step 302, process 300 includes identifying a presence of a reduction of power in an optical transmission band of an optical communications network. For example, optical network management system 102 may identify the presence of the reduction of power in an optical transmission band of a plurality of optical transmission bands of an optical communications network. In some non-limiting embodiments, the optical transmission band may be a C-band (e.g., electromagnetic spectrum in a range of wavelengths between 1530 nm to 1565 nm) or an L-band (e.g., electromagnetic spectrum in a range of wavelengths between 1570 nm to 1610 nm). In some non-limiting embodiments, the optical transmission band may be a band that does not include the C-band or L-band. In some non-limiting embodiments, the optical transmission band may be a band other than the C-band or L-band.

In some non-limiting embodiments, optical network management system 102 may identify the presence of a reduction of power in an optical transmission band as a total loss of power in the optical transmission band. In some non-limiting embodiments, optical network management system 102 may identify the presence of the reduction of power as a reduction in an amount of power in the optical transmission band that is less than a total loss of power. For example, optical network management system 102 may identify the presence of the reduction of power as a reduction in an amount of power in the optical transmission band that satisfies a threshold amount of power loss.

In some non-limiting embodiments, optical network management system 102 may identify the presence of the reduction of power in an optical transmission band based on a measurement of an amount of power in the optical transmission band. For example, optical network management system 102 may identify the presence of the reduction of power in an optical transmission band based on a reading of an OCM. In some non-limiting embodiments, the reading may show that the reduction of power in the optical transmission band is taking place in real-time.

As shown in FIG. 3, at step 304, process 300 includes determining a cause of the reduction of power in the optical transmission band. For example, optical network management system 102 may determine a cause of the reduction of power in the optical transmission band based on identifying the presence of the reduction of power in the optical transmission band.

In some non-limiting embodiments, optical network management system 102 may determine the cause of the reduction of power in the optical transmission band based on a signal from a sensing device of the optical communications network, such as an OCM. For example, optical network management system 102 may receive the signal from the OCM, and optical network management system 102 may determine the cause of the reduction of power based on information included in the signal from the sensor device.

In some non-limiting embodiments, optical network management system 102 may determine the cause of the reduction of power in the optical transmission band based on a signal from a plurality of photodiodes. For example, optical network management system 102 may receive a first signal indicating a failure condition of an optical communications device of the optical communications network from a first photodiode of a plurality of photodiodes and a second signal indicating a failure condition of the optical communications device of the optical communications network from a second photodiode of the plurality of photodiodes. In such an example, optical network management system 102 may determine an identification of the optical communications device based on the first signal and the second signal. In some non-limiting embodiments, optical network management system 102 may determine the identification of the optical communications device based on position of the plurality of photodiodes in the optical communications network. In some non-limiting embodiments, optical network management system 102 may determine that the optical communications device is not functioning properly based on the first signal and/or the second signal.

As shown in FIG. 3, at step 306, process 300 includes performing an action to rectify the reduction of power in the optical transmission band using an optical communications light source. For example, optical network management system 102 may perform the action to rectify the reduction of power in the optical transmission band using one or more optical communications light sources. In some non-limiting embodiments, the optical communications light source may include an ASE light source.

In some non-limiting embodiments, optical network management system 102 may perform the action to rectify the reduction of power in the optical transmission band using the optical communications light source within 50 ms of identifying the presence of the reduction of power in the optical transmission band. For example, optical network management system 102 may perform the action to rectify the reduction of power within 30 ms, 20 ms, or 10 ms of identifying the presence of the reduction of power in the optical transmission band.

In some non-limiting embodiments, optical network management system 102 may cause the optical communications light source to emit light. For example, optical network management system 102 may cause the optical communications light source to emit light on a path (e.g., a specific path, such as a channel) of an optical communications network. In some non-limiting embodiments, when performing the action to rectify the reduction of power in the optical transmission band using the optical communications light source, optical network management system 102 may activate a first optical switch (e.g., based on a first signal received from a first photodiode and/or a second signal received from a second photodiode) and/or a second optical switch (e.g., based on a first signal received from a first photodiode and/or a second signal received from a second photodiode) that allows the optical communications light source to emit light on a specific path defined by the first optical switch and/or the second optical switch. In some non-limiting embodiments, optical network management system 102 may activate the optical communications light source based on activating the first optical switch and/or the second optical switch. In some non-limiting embodiments, an optical switch (e.g., the first optical switch or the second optical switch) may include a WSS, a WB switch, and/or a variable optical attenuator (VOA) array.

Figure 4:
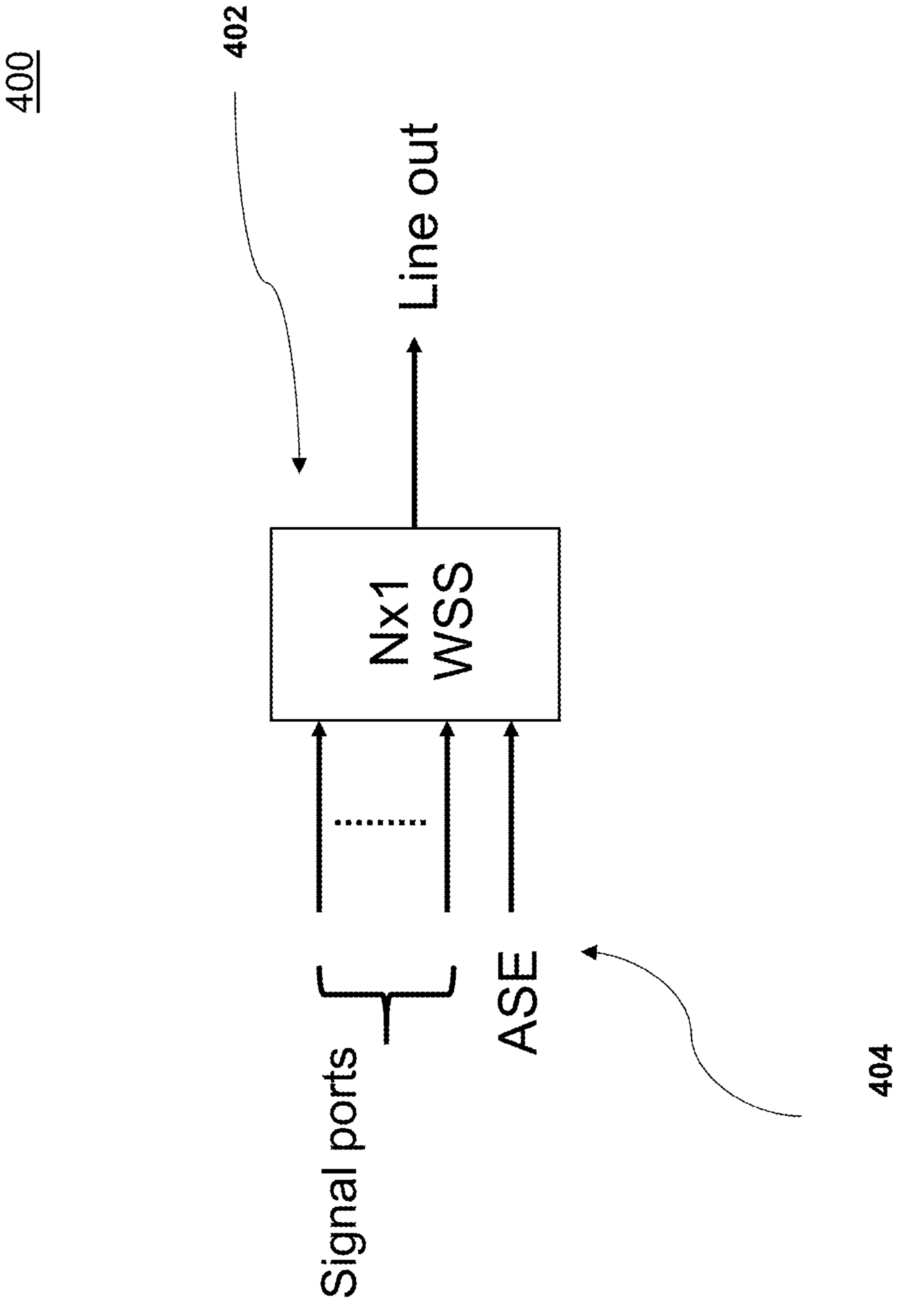
FIG. 4 is a diagram of a non-limiting embodiment of an amplified spontaneous emission (ASE) light source connected to a wavelength selective switch (WSS)

Referring now to FIG. 4, FIG. 4 is a diagram of a non-limiting embodiment of an ASE light source 404 connected to a WSS 402. As shown in FIG. 4, WSS 402 includes a plurality of signal ports as inputs to WSS 402 and a line out as an output to WSS 402. As further shown in FIG. 4, ASE light source 404 may be connected to a signal port of WSS 402 as an input. In some non-limiting embodiments, in the event of a failure of one or more inputs of WSS 402, WSS 402 may provide light received from ASE light source 404 as an output of WSS 402.

In some non-limiting embodiments, ASE light source 404 may insert light on an input based on an OCM (e.g., a C-band OCM or an L-band OCM) that performs a scan operation (e.g., at 2 scans/sec) with either a line card or node control loop that function at a time interval of 10 seconds or longer based on a power balancing algorithm. In some non-limiting embodiments, ASE light source 404 may insert light on an input and WSS 402 may provide the light to a line out of WSS 402 in a range of between 100 ms and 100 seconds.

Figure 5:
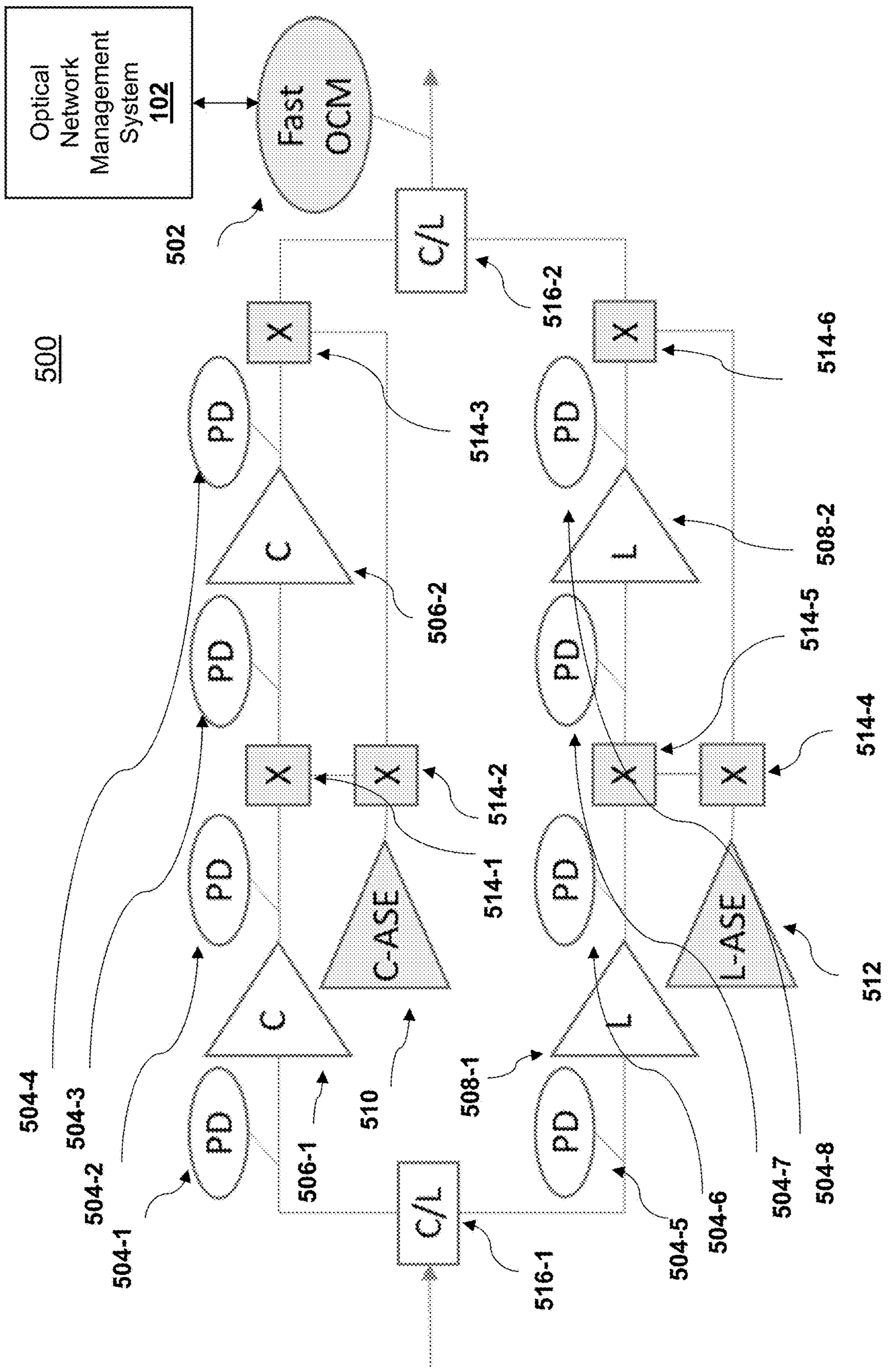
FIG. 5 is a diagram of a non-limiting embodiment of an optical communications network according to the presently disclosed subject matter.

Referring now to FIG. 5, FIG. 5 a diagram of a non-limiting embodiment of optical communications network 500. As shown in FIG. 5, optical communications network 500 may include fast OCM 502 connected to optical network management system 102. In some non-limiting embodiments, optical network management system 102 may include fast OCM 502 or optical network management system 102 may be a component of fast OCM 502. As further shown in FIG. 5, optical communications network

500 may include a plurality of photodiodes 504-1 through 504-8, which may be positioned adjacent each of amplifier 506-1, amplifier 506-2, amplifier 508-1, amplifier 508-2, respectively. In some non-limiting embodiments, amplifier 506-1 and amplifier 506-2 may be components of a C-band section of optical communications network 500, and amplifier 508-1 and amplifier 508-2 may be components of an L-band section of optical communications network 500. As further shown in FIG. 5, optical communications network 500 may include C-band ASE (C-ASE) light source 510 connected to the other components of the C-band section via optical switches 514-1, 514-2, and 514-3. As further shown in FIG. 5, optical communications network 500 may include L-band ASE (L-ASE) light source 512 connected to the other components of the L-band section via optical switches 514-4, 514-5, and 514-6. In addition, optical communications network 500 may include band splitter 516-1 at a first end of optical communications network 500 where the C-band section and the L-band section separate and band coupler 516-2 at a second end of optical communications network 500 where the C-band section and the L-band section combine. As further shown in FIG. 5, a combined C-band and L-band signal is received by band splitter 516-1, and fast OCM 502 is connected downstream of band coupler 516-2.

In some non-limiting embodiments, optical network management system 102 may identify the presence of the reduction of power in the C-band or the L-band of optical communications network 500 based on a reading of fast OCM 502. For example, optical network management system 102 may identify the presence of the reduction of power in a first optical transmission band of optical communications network 500 based on a reading of fast OCM 502.

In some non-limiting embodiments, optical network management system 102 may determine a cause of the reduction of power in the C-band or the L-band of optical communications network 500 based on identifying the presence of the reduction of power in the C-band or the L-band. In one example, regarding a reduction of power in the C-band, optical network management system 102 may receive a first signal indicating a failure condition of amplifier 506-1 from photodiode 504-1 and a second signal indicating a failure condition of amplifier 506-1 from photodiode 504-2. Optical network management system 102 may determine an identification of amplifier 506-1 based on the first signal and the second signal. In some non-limiting embodiments, optical network management system 102 may determine the identification of amplifier 506-1 based on determining that amplifier 506-1 is positioned between photodiode 504-1 and photodiode 504-2. In some non-limiting embodiments, optical network management system 102 may determine that amplifier 506-1 is not functioning properly based on the first signal and/or the second signal. In some non-limiting embodiments, optical network management system 102 may determine a cause of a reduction of power based on a failure of amplifier 506-2 (e.g., determine the cause based on a signal from photodiode 504-3 and a signal from photodiode 504-4), amplifier 508-1 (e.g., determine the cause based on a signal from photodiode 504-5 and a signal from photodiode 504-6), and/or amplifier 508-2 (e.g., determine the cause based on a signal from photodiode 504-7 and a signal from photodiode 504-8) in the same or similar fashion as described above.

In some non-limiting embodiments, optical network management system 102 may perform an action to rectify the reduction of power in the C-band of optical communications network using C-ASE light source 510. In one example, based on a failure of amplifier 506-1, optical network management system 102 may activate optical switch 514-1 and optical switch 514-2 based on a signal from photodiode 504-1 and signal from photodiode 504-2. In such an example, optical network management system 102 may cause optical switch 514-1 and optical switch 514-2 to change to a state where optical switch 514-1 and optical switch 514-2 allow light to pass through. In such an example, optical network management system 102 may activate C-ASE light source 510 based on activating optical switch 514-1 and/or optical switch 514-2.

In another example, based on a failure of amplifier 506-1 and/or amplifier 506-2, optical network management system 102 may deactivate optical switch 514-1 and activate optical switch 514-2 and optical switch 514-3 based on a signal from photodiode 504-1 and signal from photodiode 504-2 (e.g., based on a failure of amplifier 506-1) or based on a signal from photodiode 504-3 and signal from photodiode 504-4 (e.g., based on a failure of amplifier 506-2). In such an example, optical network management system 102 may cause optical switch 514-1 to change to a state where optical switch 514-1 does not allow light to pass through and may cause optical switch 514-2 and optical switch 514-3 to change to a state where optical switch 514-2 and optical switch 514-3 allow light to pass through. In such an example, optical network management system 102 may activate C-ASE light source 510 based on deactivating optical switch 514-1 and activating optical switch 514-2 and/or optical switch 514-3.

In some non-limiting embodiments, optical network management system 102 may perform an action to rectify the reduction of power in the L-band of optical communications network using L-ASE light source 512. In one example, based on a failure of amplifier 508-1, optical network management system 102 may activate optical switch 514-4 and optical switch 514-5 based on a signal from photodiode 504-5 and signal from photodiode 504-6. In such an example, optical network management system 102 may cause optical switch 514-4 and optical switch 514-5 to change to a state where optical switch 514-4 and optical switch 514-5 allow light to pass through. In such an example, optical network management system 102 may activate L-ASE light source 512 based on activating optical switch 514-4 and/or optical switch 514-5.

In another example, based on a failure of amplifier 508-1 and/or amplifier 508-2, optical network management system 102 may deactivate optical switch 514-5 and activate optical switch 514-4 and optical switch 514-6 based on a signal from photodiode 504-5 and signal from photodiode 504-6 (e.g., based on a failure of amplifier 508-1) or based on a signal from photodiode 504-7 and signal from photodiode 504-8 (e.g., based on a failure of amplifier 508-2). In such an example, optical network management system 102 may cause optical switch 514-5 to change to a state where optical switch 514-5 does not allow light to pass through and may cause optical switch 514-4 and optical switch 514-6 to change to a state where optical switch 514-4 and optical switch 514-6 allow light to pass through. In such an example, optical network management system 102 may activate L-ASE light source 512 based on deactivating optical switch 514-5 and activating optical switch 514-4 and/or optical switch 514-6.

In some non-limiting embodiments, optical network management system 102 may perform the action to rectify the reduction of power in the C-band or L-band using C-ASE light source 510 or L-ASE light source 512 within a time interval (e.g., 50 ms, 40 ms, 30 ms, 20 ms, 10 ms, etc.) of identifying the presence of the reduction of power in the C-band or the L-band of optical communications network 500.

Figure 6:
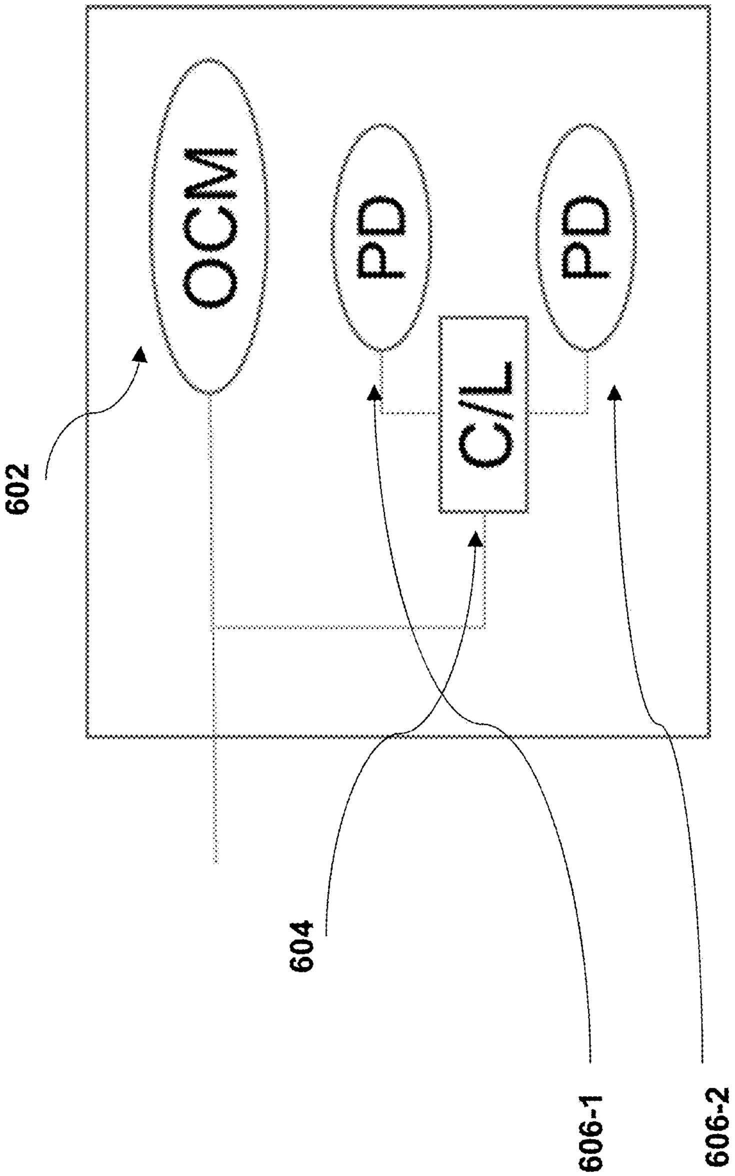
FIG. 6 is a diagram of a non-limiting embodiment of an optical channel monitor (OCM) sensing device according to the presently disclosed subject matter.

Referring now to FIG. 6, FIG. 6 is a diagram of a non-limiting embodiment of OCM sensing device 600. As shown in FIG. 6, OCM sensing device 600 may include OCM 602, band splitter 604, and photodiodes 606-1 and 606-2. In some non-limiting embodiments, OCM 602 may be configured to initiate a scan operation (e.g., a scan operation of one or more bands, one or more channels, etc.) based on a change in a power level of photodiode 606-1 and/or photodiode 606-2. In this way, OCM sensing device 600 may have a faster response than a situation where an OCM does not initiate a scan operation until a command is received (e.g., from a node of an optical communications network). Furthermore, OCM sensing device 600 may be capable of identifying between signals and light provided by an ASE light source.

Figure 7:
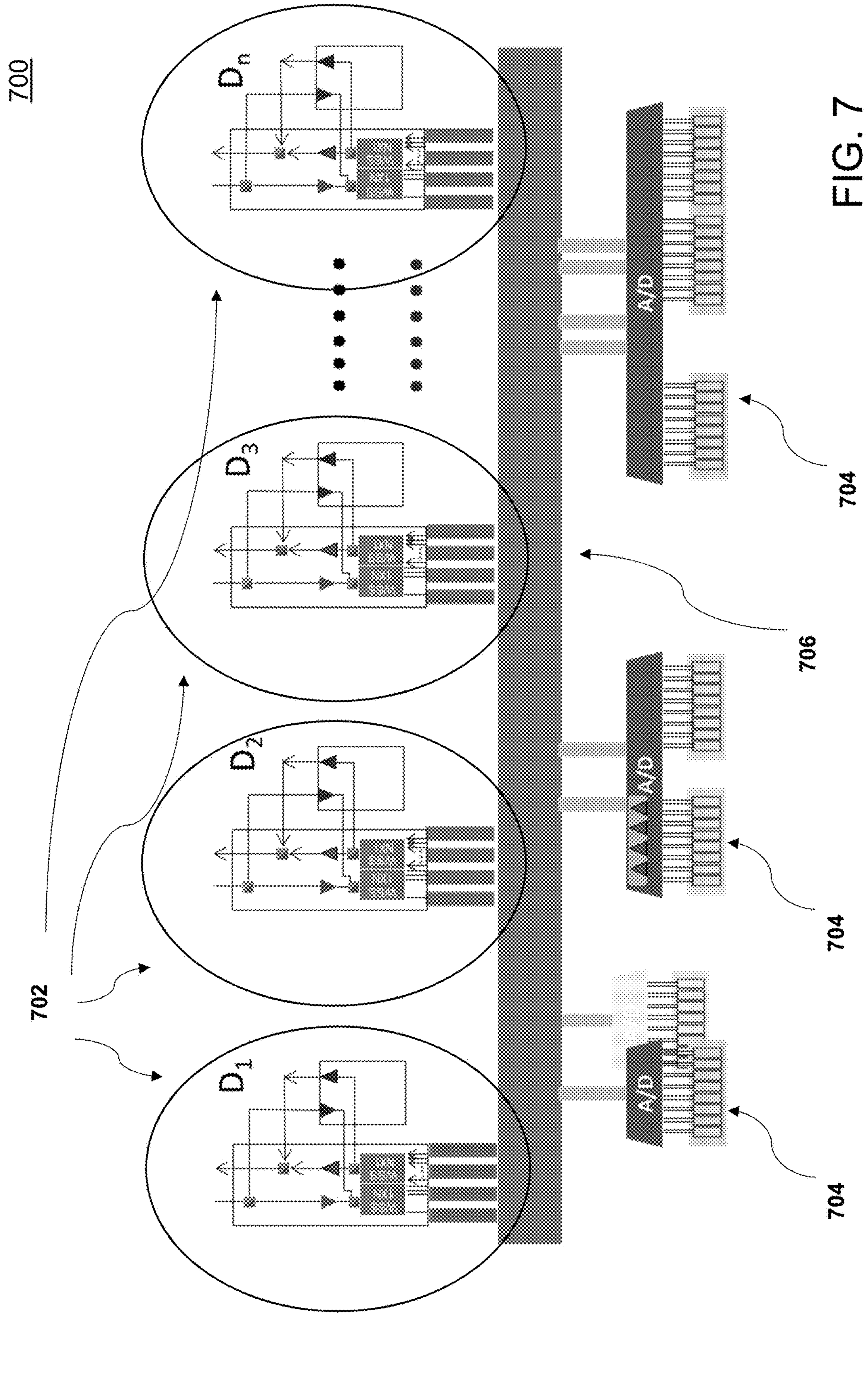
FIG. 7 is a diagram of a non-limiting embodiment of an optical communications network with a plurality of reconfigurable optical add-drop multiplexer (ROADM) nodes according to the presently disclosed subject matter.

Referring now to FIG. 7, FIG. 7 is a diagram of a non-limiting embodiment of optical communications network 700 with a plurality of reconfigurable optical add-drop multiplexer (ROADM) nodes 702. As shown in FIG. 7, optical communications network 700 may include a plurality of ROADM nodes 702, fiber interconnect 706, and a plurality of analog to digital (A/D) converter blocks 704. In some non-limiting embodiments, each ROADM node 702 may include a C-band and L-band (C+L) WSS for reception and a C+L WSS for transmission. In some non-limiting embodiments, optical network management system 102 may include a ROADM node 702 or optical network management system 102 may be a component of one or more ROADM nodes 702. In some non-limiting embodiments, fiber interconnect 706 may include a jumper, a shuffle box, and/or an optical backplane. In some non-limiting embodiments, fiber interconnect 706 may include a single optical fiber or a plurality of optical fibers. In some non-limiting embodiments, A/D converter blocks 704 may include an amplifier device (e.g., an EDFA) and provide a signal to a plurality of channels that are available at each A/D converter block 704.

In some non-limiting embodiments, ROADM nodes 702 may allow for the detection of a plurality of faults (e.g., causes of a reduction of power in an optical transmission band) that may occur on optical communications network 700. For example, ROADM nodes 702 may allow for the detection of a fault based on a fiber connection (e.g., a fiber connection within a ROADM node 702) that is broken, a fault based on a failure of a C-band and/or L-band EDFA, a fault based on a failure of fiber connection into an EDFA, a fault based on a failure of a fiber interconnect for ROADM node 702 (e.g., a failure of fiber interconnect 706 for ROADM node 702), a fault based on a failure of a fiber interconnect for A/D converter block 704 (e.g., a failure of fiber interconnect 706 for A/D converter block 704), a fault based on a failure of A/D converter block 704 drop structure (e.g., CD or CDC A/D drop structure failure, even or odd for fixed A/D converter block 704 with interleaver, or any section of an optical band), a fault based on a failure of an EDFA or array of A/D converter block 704, a fault based on a failure of a channel group (e.g., a hosting chassis failure), a fault based on a failure of an individual transceiver and/or transponder, and/or the like.

Figure 8A:
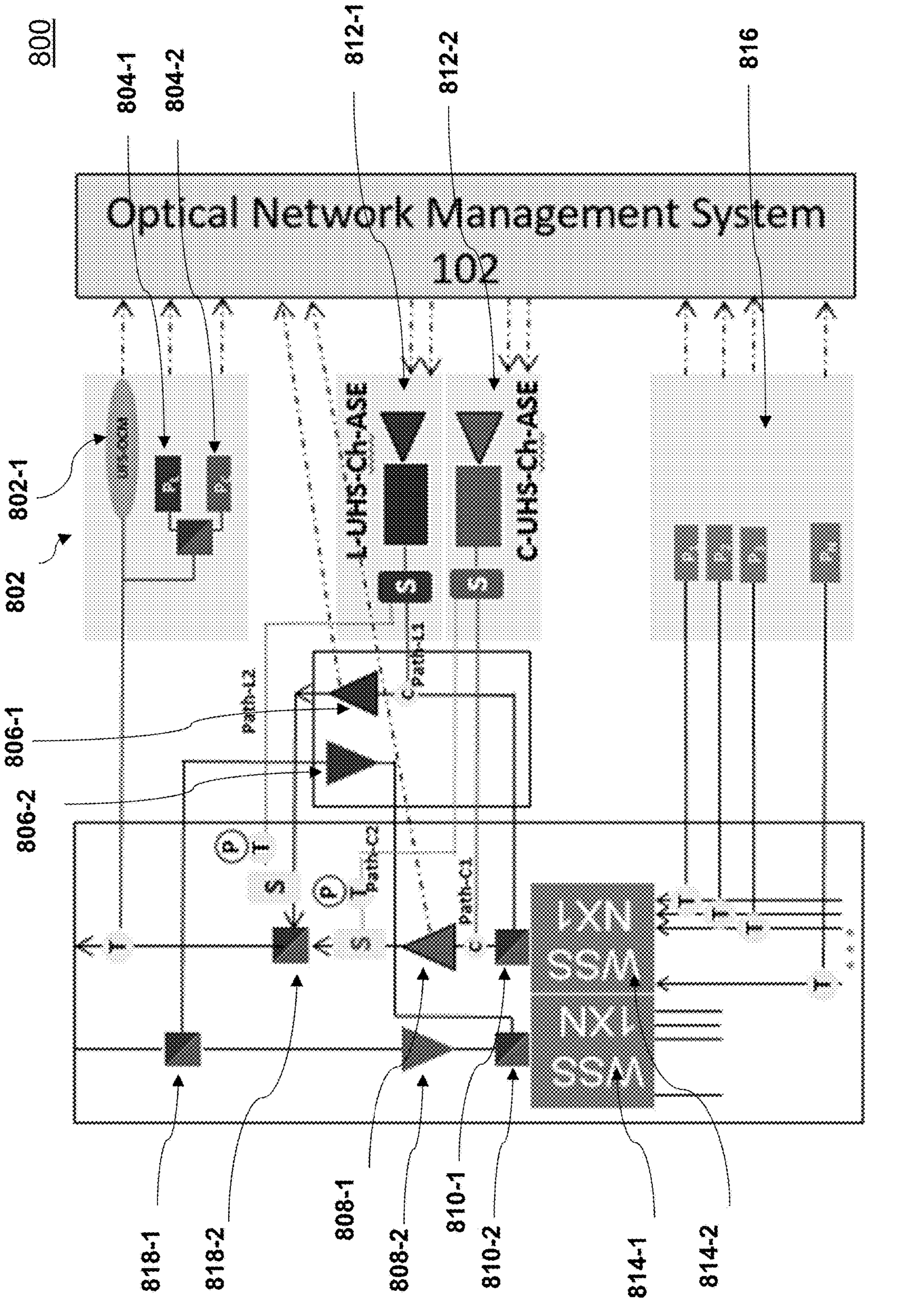

Referring now to FIG. 8A, FIG. 8A is a diagram of a non-limiting embodiment of ROADM node 800. In some non-limiting embodiments, ROADM node 800 may be the same as or similar to ROADM node 702. As shown in FIG. 8A, ROADM node 800 may include OCM sensing device 802, which may include OCM 802-1, photodiode 804-1, and photodiode 804-2. As further shown in FIG. 8A, ROADM node 800 may include EDFA 806-1, EDFA 806-2, EDFA 808-1, EDFA 808-2, band coupler 810-1, and band coupler 810-2. As further shown in FIG. 8A, ROADM node 800 may include L-band ASE light source device 812-1 and C-band ASE light source device 812-2. In some non-limiting embodiments, L-band ASE light source device 812-1 may include an ultra-high speed (UHS) channelized (CH) ASE light source that provides light in the L-band and a switch device that provides light on either a first path, path-L1, or a second path, path-L2. In some non-limiting embodiments, C-band ASE light source device 812-2 may include an ultra-high speed (UHS) channelized (CH) ASE light source that provides light in the C-band and a switch device that provides light on either a first path, path-C1, or a second path, path-C2.

As further shown in FIG. 8A, ROADM node 800 may include WSS 814-1, WSS 814-2, and a plurality of photodiodes 816. In some non-limiting embodiments, WSS 814-1 may include a WSS that is configured on a receive path of ROADM node 800. In some non-limiting embodiments, WSS 814-2 may include a WSS that is configured on a transmit path of ROADM node 800. In some non-limiting embodiments, the plurality of photodiodes 816 may act as monitors for each path that is an input to WSS 814-2. As further shown in FIG. 8A, ROADM node 800 may include band splitter 818-1 and band splitter 818-2.

In some non-limiting embodiments, optical network management system 102 may monitor ROADM node 800 for a fault based on a trigger. In some non-limiting embodiments, optical network management system 102 may monitor ROADM node 800 for a fault based on a trigger that is provided by a signal of a photodiode of the plurality of photodiodes 816, an alarm that indicates a loss of signal from EDFA 806-1, an alarm that indicates a loss of signal from EDFA 808-1, an alarm that indicates a loss of power from EDFA 806-1, an alarm that indicates a loss of power from EDFA 808-1, a signal from OCM 802-1 associated with an optical supervision channel (e.g., a signal indicating that an uplink is down), a signal from photodiode 804-1, and/or a signal from photodiode 804-2.

Referring now to FIG. 8B, FIG. 8B is a non-limiting embodiment of a table 801A associated with actions for recovery of transport system faults of ROADM node 800. As shown in the table, a trigger to optical network management system 102 may be provided in 1-2 ms, optical network management system 102 may cause OCM 802-1 to perform a scan operation in less than 10 ms, and optical network management system 102 may provide light from L-band ASE light source device 812-1 and/or C-band ASE light source device 812-2 in less than 20 ms (e.g., based on an optical switch activating in less than 10 ms and L-band ASE light source device 812-1 and/or C-band ASE light source device 812-2 providing light in less than 10 ms).

As shown in table 801A, a signal from photodiode 804-1 may provide a trigger to optical network management system 102, and optical network management system 102 may cause OCM 802-1 to perform a scan operation (e.g., an L-band scan operation), and optical network management system 102 may provide light from L-band ASE light source device 812-1 along path C1 and path L2 of ROADM node 800.

As further shown in table 801A, an alarm that indicates a loss of power from EDFA 808-1 and a signal from photodiode 804-2 may provide a trigger to optical network management system 102, and optical network management system 102 may cause OCM 802-1 to perform a scan operation (e.g., a C-band scan operation), and optical network management system 102 may provide light from C-band ASE light source device 812-2 along path C2 and path L1 of ROADM node 800. As further shown in table 801A, an alarm that indicates a loss of power from EDFA 806-1 and a signal from photodiode 804-1 may provide a trigger to optical network management system 102, and optical network management system 102 may cause OCM 802-1 to perform a scan operation (e.g., a L-band scan operation), and optical network management system 102 may provide light from L-band ASE light source device 812-1 along path C1 and path L2 of ROADM node 800.

As further shown in table 801A, an alarm that indicates a loss of power from EDFA 806-1 and a signal from photodiode 804-1 may provide a trigger to optical network management system 102, and optical network management system 102 may cause OCM 802-1 to perform a scan operation (e.g., a L-band scan operation), and optical network management system 102 may provide light from L-band ASE light source device 812-1 along path C1 and path L2 of ROADM node 800. As further shown in table 801A, an alarm that indicates a loss of signal from EDFA 808-1 may provide a trigger to optical network management system 102, and optical network management system 102 may cause OCM 802-1 to perform a scan operation (e.g., a C-band scan operation), and optical network management system 102 may provide light from C-band ASE light source device 812-2 along path C2 and path L1 of ROADM node 800.

As further shown in table 801A, an alarm that indicates a loss of signal from EDFA 806-1 may provide a trigger to optical network management system 102, and optical network management system 102 may cause OCM 802-1 to perform a scan operation (e.g., an L-band scan operation), and optical network management system 102 may provide light from L-band ASE light source device 812-1 along path C1 and path L2 of ROADM node 800. As further shown in table 801A, a signal of a photodiode of the plurality of photodiodes 816 may provide a trigger to optical network management system 102, and optical network management system 102 may cause OCM 802-1 to perform a scan operation (e.g., an L-band scan operation and a C-band scan operation,) and optical network management system 102 may provide light from L-band ASE light source device 812-1 and/or C-band ASE light source device 812-2 along path C1 and path L1 of ROADM node 800.

Figure 9A:
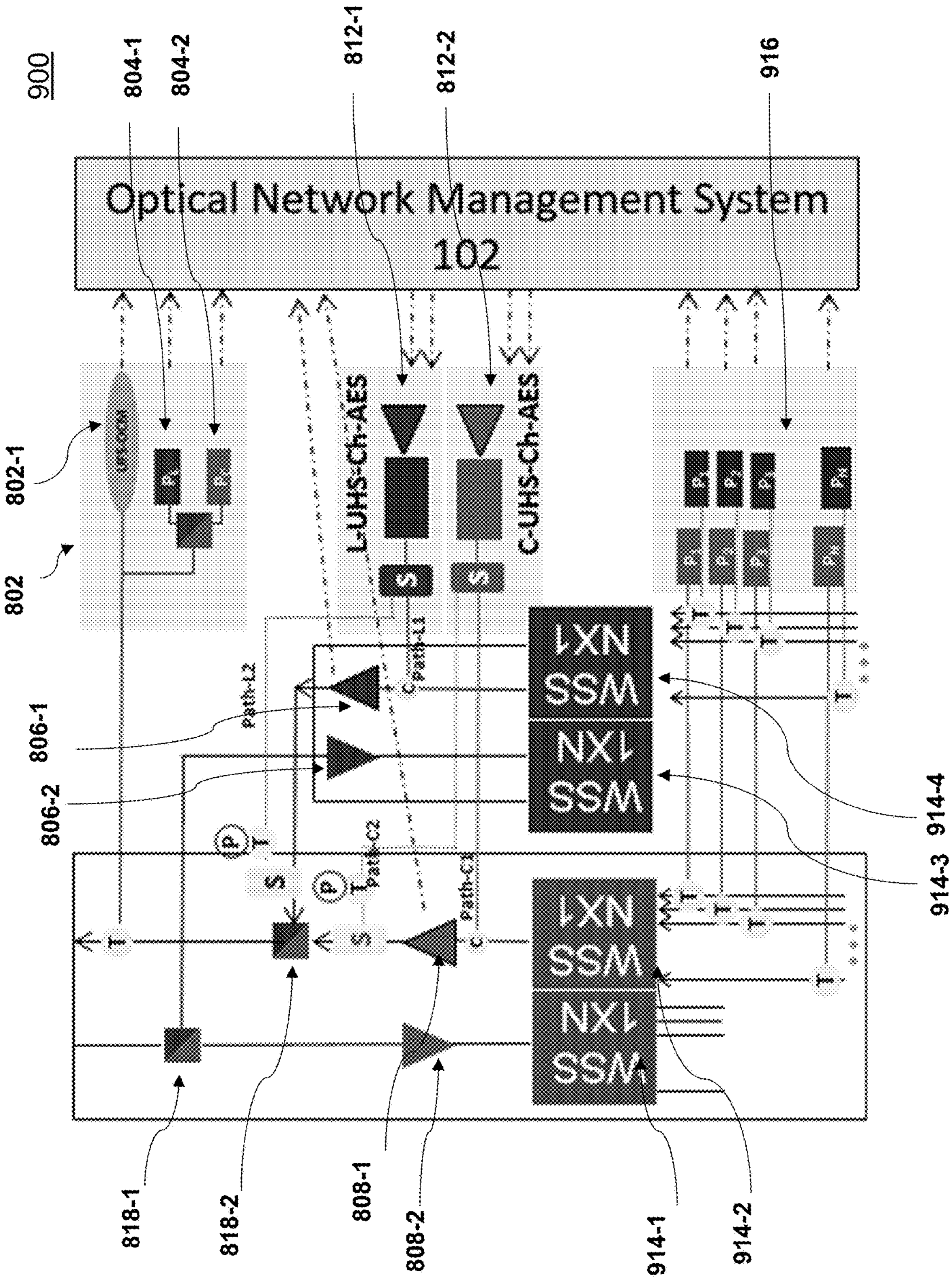

Referring now to FIG. 9A, FIG. 9A is a diagram of a non-limiting embodiment of ROADM node 900. In some non-limiting embodiments, ROADM node 900 may be the same as or similar to ROADM node 702 and/or ROADM node 800. As shown in FIG. 9A, ROADM node 900 may include OCM sensing device 802, which may include OCM 802-1, photodiode 804-1, and photodiode 804-2. As further shown in FIG. 9A, ROADM node 900 may include EDFA 806-1, EDFA 806-2, EDFA 808-1, and EDFA 808-2. As further shown in FIG. 8A, ROADM node 800 may include L-band ASE light source device 812-1 and C-band ASE light source device 812-2. In some non-limiting embodiments, L-band ASE light source device 812-1 may include an ultra-high speed (UHS) channelized (CH) ASE light source that provides light in the L-band and a switch device that provides light on either a first path, path-L1, or a second path, path-L2. In some non-limiting embodiments, C-band ASE light source device 812-2 may include an ultra-high speed (UHS) channelized (CH) ASE light source that provides light in the C-band and a switch device that provides light on either a first path, path-C1, or a second path, path-C2.

As further shown in FIG. 9A, ROADM node 900 may include WSS 914-1, WSS 914-2, WSS 914-3, WSS 914-4, and a plurality of photodiodes 916. In some non-limiting embodiments, WSS 914-1 and WSS 914-3 may include a WSS that is configured on a receive path of ROADM node 800. In some non-limiting embodiments, WSS 914-2 and WSS 914-4 may include a WSS that is configured on a transmit path of ROADM node 900. In some non-limiting embodiments, the plurality of photodiodes 916 may act as monitors for each path that is an input to WSS 914-2 and/or WSS 914-4. As further shown in FIG. 9A, ROADM node 900 may include band splitter 818-1 and band splitter 818-2.

In some non-limiting embodiments, optical network management system 102 may monitor ROADM node 900 for a fault based on a trigger. In some non-limiting embodiments, optical network management system 102 may monitor ROADM node 900 for a fault based on a trigger that is provided by a signal of a photodiode of the plurality of photodiodes 916, an alarm that indicates a loss of signal from EDFA 806-1, an alarm that indicates a loss of signal from EDFA 808-1, an alarm that indicates a loss of power from EDFA 806-1, an alarm that indicates a loss of power from EDFA 808-1, a signal from OCM 802-1 associated with an optical supervision channel (e.g., a signal indicating that an uplink is down), a signal from photodiode 804-1, and/or a signal from photodiode 804-2.

Referring now to FIG. 9B, FIG. 9B is a non-limiting embodiment of a table 801B associated with actions for recovery of transport system faults of ROADM node 900. As shown in table 801B of FIG. 9B, which is similar to table 801A shown in FIG. 8B, any of the faults listed as 1-9 are the same as the faults listed in table 801A shown in FIG. 8B In addition, as shown in FIG. 9B, an alarm that indicates a loss of signal from EDFA 806-1 and an alarm that indicates a loss of signal from EDFA 808-1, may provide a trigger to optical network management system 102, and optical network management system 102 may cause OCM 802-1 to perform a scan operation (e.g., an L-band scan operation and a C-band scan operation), and optical network management system 102 may provide light from L-band ASE light source device 812-1 and/or C-band ASE light source device 812-2 along path C2 and path L1, and path C1 and path L2 of ROADM node 800.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A system for recovery of transport system faults, comprising:

a first optical communications light source associated with a first optical transmission band of a plurality of optical transmission bands of an optical communications network; and a second optical communications light source associated with a second optical transmission band of the plurality of optical transmission bands of the optical communications network;

at least one processor programmed or configured to:

cause an optical channel monitor (OCM) to perform a scan operation of one or more optical transmission bands of the plurality of optical transmission bands of the optical communications network without the OCM receiving a command to initiate the scan operation from a node of the optical communications network;

identify a presence of a reduction of power in the first optical transmission band of the plurality of optical transmission bands of the optical communications network based on a reading of the OCM, wherein the reading indicates that the reduction of power in the first optical transmission band is taking place in real-time;

determine a cause of the reduction of power in the first optical transmission band based on identifying the presence of the reduction of power in the first optical transmission band; and perform an action to rectify the reduction of power in the first optical transmission band using the first optical communications light source without using the second optical communications light source;

wherein, when determining the cause of the reduction of power in the first optical transmission band, the at least one processor is programmed or configured to:

receive a first signal indicating a failure condition of an optical communications device of the optical communications network from a first photodiode of a plurality of photodiodes;

receive a second signal indicating the failure condition of the optical communications device of the optical communications network from a second photodiode of the plurality of photodiodes; and determine an identification of the optical communications device based on the first signal and the second signal;

wherein, when performing the action to rectify the reduction of power in the first optical transmission band using the first optical communications light source, the at least one processor is programmed or configured to:

activate a first optical switch based on the first signal and the second signal;

activate a second optical switch based on the first signal and the second signal; and activate the first optical communications light source based on activating the first optical switch and the second optical switch.

2. The system of claim 1, wherein, when determining the cause of the failure, the at least one processor is programmed or configured to:

determine that the optical communications device is not functioning properly based on the first signal and the second signal.

3. The system of claim 1, wherein, when performing the action to rectify the reduction of power in the first optical transmission band using the first optical communications light source, the at least one processor is programmed or configured to:

activate at least one of wavelength selective switch (WSS) or a wavelength blocking (WB) switch based on the first signal and the second signal; and activate the first optical communications light source based on activating the WSS or the WB switch.

4. The system of claim 1, wherein, when performing the action to rectify the reduction of power in the first optical transmission band using the first optical communications light source, the at least one processor is programmed or configured to:

perform the action to rectify the reduction of power in the first optical transmission band using the first optical communications light source within 50 ms of identifying the presence of the reduction of power in the first optical transmission band.

5. A method for recovery of transport system faults, comprising:

causing, with at least one processor, an optical channel monitor (OCM) to perform a scan operation of one or more optical transmission bands of a plurality of optical transmission bands of an optical communications network without the OCM receiving a command to initiate the scan operation from a node of the optical communications network;

identifying, with at least one processor, a presence of a reduction of power in a first optical transmission band of the plurality of optical transmission bands of the optical communications network based on a reading of the OCM, wherein the reading indicates that the reduction of power in the first optical transmission band is taking place in real-time;

determining, with at least one processor, a cause of the reduction of power in the first optical transmission band based on identifying the presence of the reduction of power in the first optical transmission band; and performing, with at least one processor, an action to rectify the reduction of power in the first optical transmission band using a first optical communications light source associated with the first optical transmission band of the plurality of optical transmission bands of the optical communications network without using a second optical communications light source associated with a second optical transmission band of the plurality of optical transmission bands of the optical communications network;

wherein determining the cause of the reduction of power in the first optical transmission band comprises:

receiving a first signal indicating a failure condition of an optical communications device of the optical communications network from a first photodiode of a plurality of photodiodes;

receiving a second signal indicating the failure condition of the optical communications device of the optical communications network from a second photodiode of the plurality of photodiodes; and determining an identification of the optical communications device based on the first signal and the second signal;

wherein performing the action to rectify the reduction of power in the first optical transmission band using the first optical communications light source comprises:

activating a first optical switch based on the first signal and the second signal;

activating a second optical switch based on the first signal and the second signal; and activating the first optical communications light source based on activating the first optical switch and the second optical switch.

6. The method of claim 5, wherein determining the cause of the failure comprises:

determining that the optical communications device is not functioning properly based on the first signal and the second signal.

7. The method of claim 5, wherein performing the action to rectify the reduction of power in the first optical transmission band using the first optical communications light source comprises:

activating at least one of wavelength selective switch (WSS) or a wavelength blocking (WB) switch based on the first signal and the second signal; and activating the first optical communications light source based on activating the WSS or the WB switch.

8. The method of claim 5, wherein performing the action to rectify the reduction of power in the first optical transmission band using the first optical communications light source comprises:

performing the action to rectify the reduction of power in the first optical transmission band using the first optical communications light source within 50 ms of identifying the presence of the reduction of power in the first optical transmission band.

9. A computer program product for recovery of transport system faults comprising at least one non-transitory computer-readable medium including one or more instructions that, when executed by at least one processor, cause the at least one processor to:

cause an optical channel monitor (OCM) to perform a scan operation of one or more optical transmission bands of a plurality of optical transmission bands of an optical communications network without the OCM receiving a command to initiate the scan operation from a node of the optical communications network;

identify a presence of a reduction of power in a first optical transmission band of the plurality of optical transmission bands of the optical communications network based on a reading of the OCM, wherein the reading indicates that the reduction of power in the first optical transmission band is taking place in real-time;

determine a cause of the reduction of power in the first optical transmission band based on identifying the presence of the reduction of power in the first optical transmission band; and perform an action to rectify the reduction of power in the first optical transmission band using a first optical communications light source associated with the first optical transmission band of the plurality of optical transmission bands of the optical communications network without using a second optical communications light source associated with a second optical transmission band of the plurality of optical transmission bands of the optical communications network;

wherein, the one or more instructions that cause the at least one processor to determine the cause of the reduction of power in the first optical transmission band, cause the at least one processor is programmed or configured to:

receive a first signal indicating a failure condition of an optical communications device of the optical communications network from a first photodiode of a plurality of photodiodes;

receive a second signal indicating the failure condition of the optical communications device of the optical communications network from a second photodiode of the plurality of photodiodes; and determine an identification of the optical communications device based on the first signal and the second signal;

wherein, the one or more instructions that cause the at least one processor to perform the action to rectify the reduction of power in the first optical transmission band using the first optical communications light source, cause the at least one processor to:

activate a first optical switch based on the first signal and the second signal;

activate a second optical switch based on the first signal and the second signal; and activate the first optical communications light source based on activating the first optical switch and the second optical switch.

10. The computer program product of claim 9, wherein, the one or more instructions that cause the at least one processor to determine the cause of the failure, cause the at least one processor to:

determine that the optical communications device is not functioning properly based on the first signal and the second signal.

11. The computer program product of claim 9, wherein, the one or more instructions that cause the at least one processor to perform the action to rectify the reduction of power in the first optical transmission band using the first optical communications light source, cause the at least one processor to:

activate at least one of wavelength selective switch (WSS) or a wavelength blocking (WB) switch based on the first signal and the second signal; and activate the first optical communications light source based on activating the WSS or the WB switch.

* * * * *